(12) United States Patent
Khalizadeh

(10) Patent No.: US 7,187,087 B2
(45) Date of Patent: Mar. 6, 2007

(54) FLYWHEEL SYSTEM WITH SYNCHRONOUS RELUCTANCE AND PERMANENT MAGNET GENERATORS

(75) Inventor: Claude Khalizadeh, Newbury Park, CA (US)

(73) Assignee: Pentadyne Power Corporation, Chatsworth, CA (US)

( * ) Notice: Subject to any disclaimer, the term of this patent is extended or adjusted under 35 U.S.C. 154(b) by 0 days.

(21) Appl. No.: 11/251,394

(22) Filed: Oct. 14, 2005

(65) Prior Publication Data

US 2006/0038453 A1 Feb. 23, 2006

Related U.S. Application Data

(62) Division of application No. 10/863,868, filed on Jun. 7, 2004.

(60) Provisional application No. 60/476,226, filed on Jun. 6, 2003.

(51) Int. Cl.
*H02K 7/09* (2006.01)

(52) U.S. Cl. .................... 290/1 R; 310/90.5

(58) Field of Classification Search ............ 310/90.5
See application file for complete search history.

(56) References Cited

U.S. PATENT DOCUMENTS

| | | | | |
|---|---|---|---|---|
| 4,278,928 A | * | 7/1981 | Griffiths et al. | 322/29 |
| 4,444,444 A | * | 4/1984 | Benedetti et al. | 310/90.5 |
| 4,612,494 A | * | 9/1986 | Kawamura | 322/4 |
| 5,245,270 A | * | 9/1993 | Akiyama | 322/4 |
| 5,574,345 A | * | 11/1996 | Yoneta et al. | 318/376 |
| 5,998,899 A | * | 12/1999 | Rosen et al. | 310/90.5 |

FOREIGN PATENT DOCUMENTS

| JP | 09233803 A | * | 9/1997 |
|---|---|---|---|
| WO | WO 2004068677 | * | 8/2004 |

* cited by examiner

*Primary Examiner*—Joseph Waks
(74) *Attorney, Agent, or Firm*—Paul D. Chancellor; Jeffrey F. Craft; Jackson, DeMarco, Tidus & Peckenpaugh

(57) ABSTRACT

A flywheel system incorporates a variable speed synchronous reluctance motor-generator and a variable speed permanent magnet generator for providing backup power. Rotating elements are supported by electromagnetic bearings and electric power provided by the backup generator maintains electromagnetic bearing operation during that portion of a coast down period when shaft speed falls below the minimum speed required for operation of the synchronous reluctance motor-generator.

11 Claims, 4 Drawing Sheets

FLYWHEEL SYSTEM WITH SYNCHRONOUS RELUCTANCE AND PERMANENT MAGNET GENERATORS

This application is a divisional of U.S. application Ser. No. 10/863,868 filed Jun. 7, 2004, which claims priority from Provisional Application 60/476,226 filed Jun. 6, 2003.

BACKGROUND OF THE INVENTION

1. Field of the Invention

The present invention relates to the electro-mechanical arts and energy storage systems. In particular, the present invention relates to flywheel systems used for energy storage and conversion.

2. Description of Related Art

Flywheel energy storage systems have provided a mechanical energy storage solution for hundreds of years as evidenced by the potter's wheel. Such systems differ in many respects from modern-day flywheel energy storage solutions. More recent design imperatives including high power density and electric power outputs have led to lightweight, high-speed flywheels operating in evacuated chambers and driving a similarly high-speed electric generator.

A typical application for today's flywheel is to provide electric power to an electric network for a brief period of time, as might be needed when an electric power outage occurs. Such applications require that the flywheel operate in a stand-by mode, fully charged and ready to convert its mechanical energy into electrical power to support the electrical network when network supply voltage droops.

To the extent that a protracted power outage occurs and the flywheel's usable electric output is depleted by the external electric network, the flywheel's internal electrical loads may be deprived of the electric power required to complete a normal flywheel shutdown. Critical loads internal to the flywheel system may include electric and electronic controls.

Supplying electric loads internal to the flywheel system during coast down presents a particular problem when the flywheel's electric generator has a minimum operating speed as is typical of inductive generators. Here, another source of electric power will be needed during some portion of the coast down period.

SUMMARY OF THE INVENTION

Now, in accordance with the invention, there has been found a flywheel system that provides electric power to critical loads during coast down despite the absence an external power source. A flywheel mass supported by electromagnetic bearings is rotatably coupled to a motor-generator for exchanging mechanical power with the motor generator. Further, the flywheel mass is rotatably coupled to a backup generator for converting mechanical energy from the flywheel mass into electrical power for providing electrical power to the electromagnetic bearings.

BRIEF DESCRIPTION OF THE DRAWINGS

The present invention is described with reference to the accompanying drawings that illustrate the present invention and, together with the description, explain the principles of the invention enabling a person skilled in the relevant art to make and use the invention.

DESCRIPTION OF THE PREFERRED EMBODIMENTS

Figure 1:
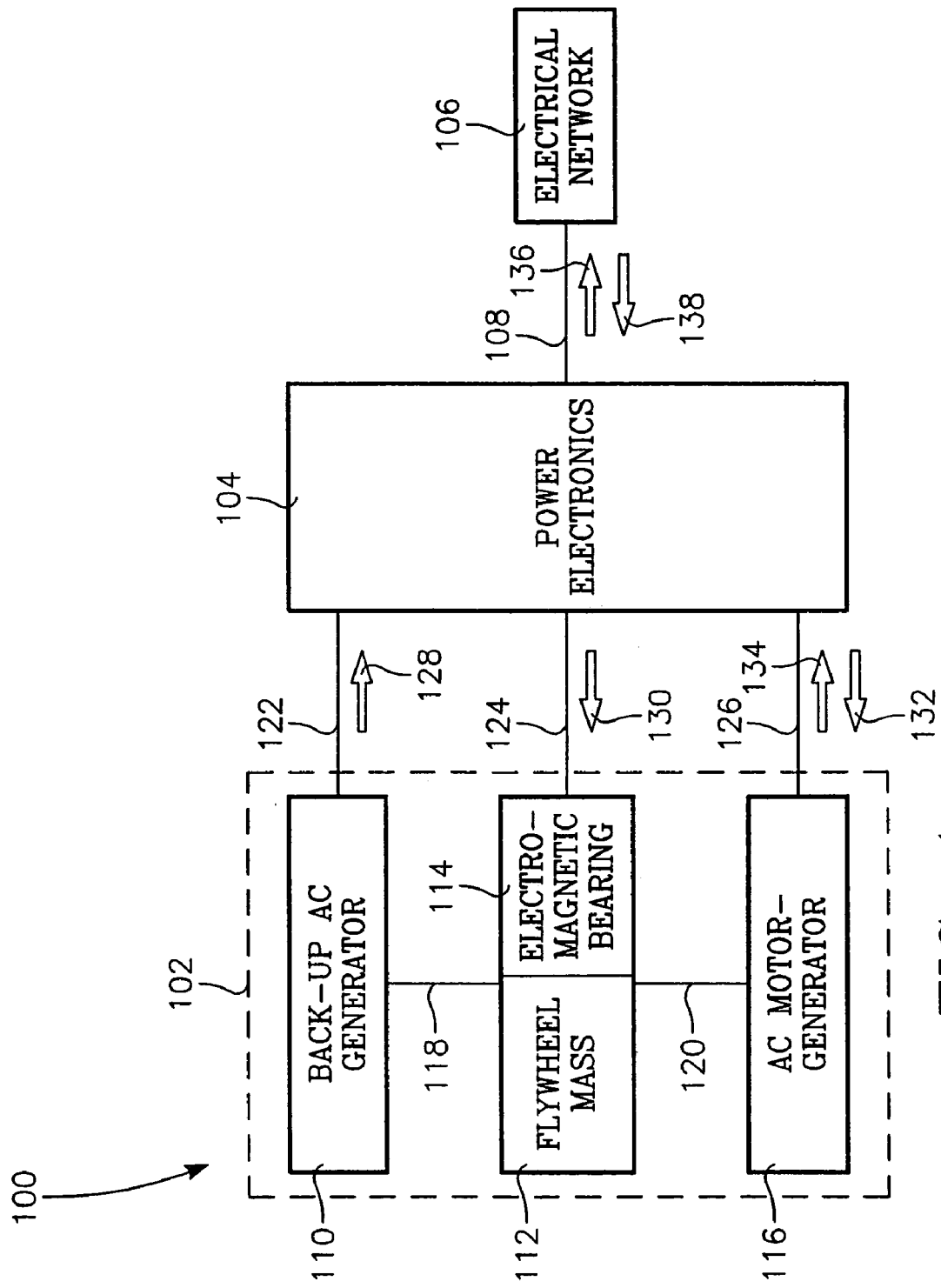
FIG. 1 is a diagram showing modules included in the flywheel backup power supply system constructed in accordance with the present invention.

FIG. 1 shows the flywheel system 100 of the present invention. It includes the flywheel module 102, power electronics module 104, and electrical network 106. In the flywheel module, a first rotatable coupling 120 interconnects the flywheel mass 112 with the motor-generator 116 and a second rotatable coupling 118 interconnects the flywheel mass with the backup generator 110. At least one electromagnetic bearing 114 provides rotatable support for the flywheel mass.

The power electronics module 104 is interconnected to sources and consumers of electric power including the backup generator 110, the motor-generator 116, and the electrical network 106, and at least one electromagnetic bearing 114.

A first electrical circuit 122 conducts electric power unidirectionally as shown by flow arrow 128 from the backup generator 110 to the power electronics module 104. A second electrical circuit 124 conducts electric power unidirectionally as shown by flow arrow 130 from the power electronics module to at least one electromagnetic bearing 114. A third electrical circuit 126 conducts electric power bi-directionally as shown by the opposed flow arrows 132, 134 between the motor-generator 116 and the power electronics module. A fourth electrical circuit 108 conducts electric power bi-directionally as shown by the opposed flow arrows 136, 138 between the power electronics module and the electrical network 106.

Flywheel system 100 charging includes absorption and storage of mechanical energy by increasing the rotational speed and hence kinetic energy of rotating elements within the flywheel module 102 including the flywheel mass 112. Flywheel system charging takes place when the electrical network 106 supplies electric power as shown by flow arrow 138 and the motor-generator 116 consumes electric power as indicated by flow arrow 132 while functioning as an electric motor.

Flywheel system 100 discharging includes releasing mechanical energy by decreasing the rotational speed and hence kinetic energy of rotating elements within the flywheel module 102 including flywheel mass 112. Flywheel discharging takes place when the electrical network 106 consumes electrical power as shown by flow arrow 136 that is supplied by the motor-generator 116 as shown by flow arrow 134 while the motor-generator functions as an electric generator.

Figure 2:
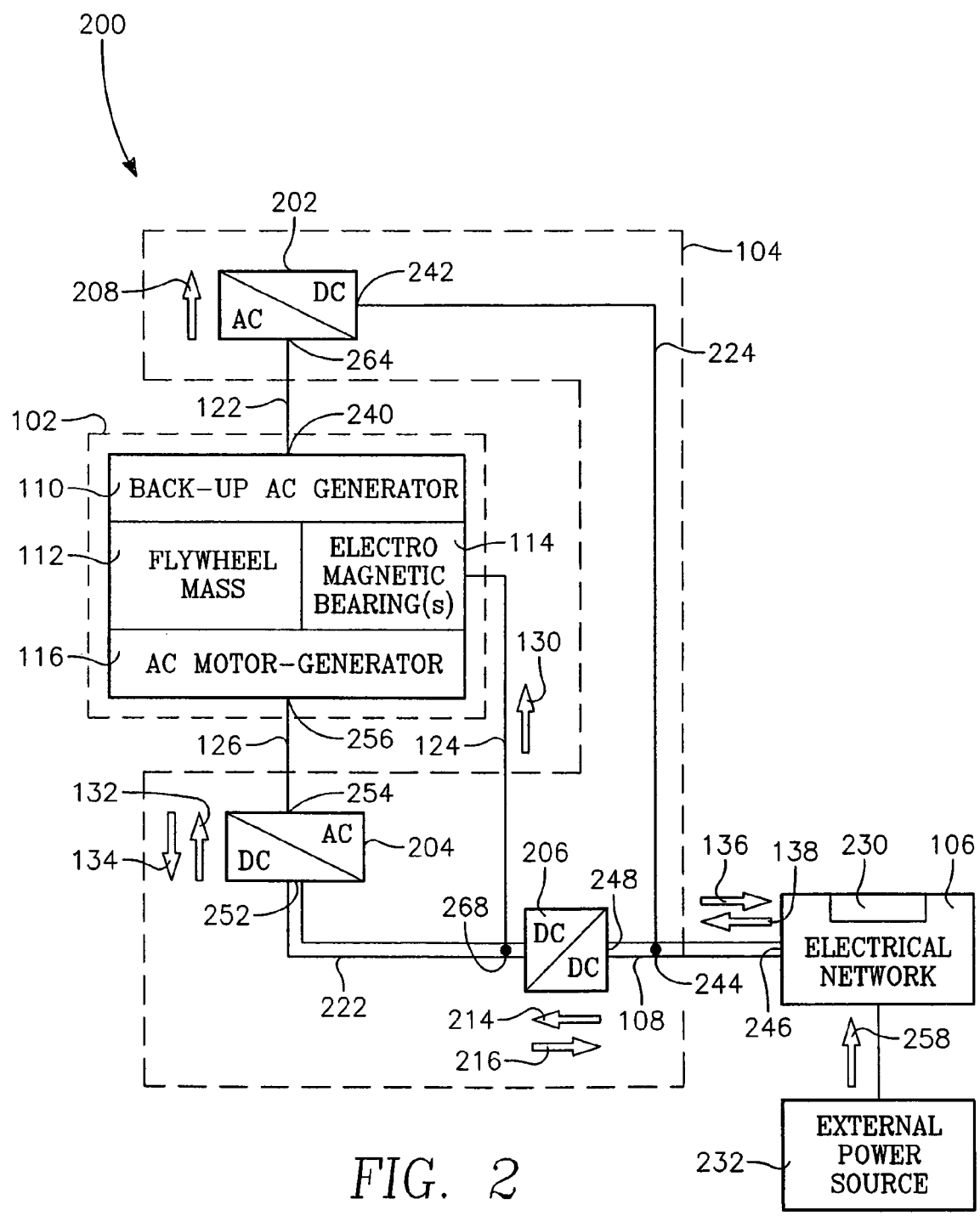
FIG. 2 is a diagram showing elements included within the power electronics module of the flywheel backup power supply system of FIG. 1.

FIG. 2 shows a first embodiment of the flywheel system including selected elements of the power electronics module 200. The power electronics module 104 includes three electric power converters. The first converter 202 is a unidirectional AC-to-DC converter, the second converter is a bidirectional AC-to-DC converter 204, and the third converter is a bi-directional DC-to-DC converter 206. The power electronics module also includes an internal DC bus 222, an external DC bus 108, and a fifth circuit 224.

As mentioned above, the first, second, and third circuits interconnect the power electronics module 104 and the flywheel module 102. What follows is a description of selected sources and users of electric power flowing in these circuits.

The first circuit 122 interconnects a backup generator AC output 240 as indicated by flow arrow 208 to a first converter AC input 264. The fifth circuit 224 connects a first converter DC output 242 to an external DC bus tap 244 on the external DC bus 108. Electric power users including the electrical network 106 and the third converter 206 thereby receive backup power from their respective interconnections 246, 248 with the external DC bus.

The second circuit 124 interconnects an electromagnetic bearing electric power input 266 to an internal DC bus tap 268 on the internal DC bus 222. Electric power flows from the internal DC bus to the electromagnetic bearing(s) 114 as shown by flow arrow 130. The internal DC bus may receive electric power from the motor-generator 116, the electric network 106 or the backup generator 110. When the motor-generator is providing electric power, the motor-generator electrical connection 256 is an AC output interconnected to a second converter AC connection 254 by the third circuit 126. Power flows from a second converter DC connection 252 as indicated by flow arrow 134 to the internal DC bus. When the electric network is providing electric power, an electric network connection 246 is a DC output interconnected to a third converter external DC connection 248 by external DC bus 108. Power flows form a third converter internal DC connection 250 as indicated by flow arrow 214 to the internal DC bus. When the backup generator is providing electric power, power flows as described above from the backup generator to the external DC bus and thereafter to the internal DC bus.

Turning now to electric power flows associated with charging and discharging the flywheel system 100, the motor-generator 116 may function either as an electric motor or as an electric generator. During charging the motor-generator functions as an electric motor. During discharging, the motor-generator functions as an electric generator.

During charging, the electric network 106 provides DC power to the third converter 206 via external DC bus 108 as indicated by flow arrow 138. The converter adjusts the voltage to a level suitable for interconnection with the internal DC bus 222 and transfers electric power as indicated by flow arrow 214 to the internal DC bus. The second converter 204 takes power from the internal DC bus, synthesizes an AC output indicated by flow arrow 132, and transfers power to the motor-generator via third circuit 126. The AC output is suitable for powering the motor-generator 116 for accelerating the flywheel 360 (see FIG. 3).

During discharging, the second converter 204 receives electric power from the motor-generator 116 via third circuit 126 as indicated by flow arrow 134. The converter adjusts the voltage to a level suitable for interconnection with the internal DC bus 222 and transfers electric power to the internal DC bus. The third converter 206 takes power from the internal DC bus and adjusts the voltage as required for interconnection with the external DC bus 108. Flow arrows 216 and 136 indicate transfer of electric power from the second converter to the electrical network via the external DC bus.

It should be noted that although the electrical network 106 is interconnected to the external DC bus 108, a person of ordinary skill in the art will recognize that the electrical network may include electrical sources and loads having electrical characteristics that differ from those of the external DC bus. Auxiliary electric power converters 230 provide for interconnecting such sources and loads to the extent they are present in the network.

It should also be noted that while output 242 of first converter 202 may be processed by third converter 206 as shown in FIG. 2, in a second embodiment, a fourth unidirectional DC-to-DC electric power converter (not shown) might be used to interconnect first converter output 242 with the electromagnetic bearings 114. In this embodiment, the fourth converter adjusts the voltage level at first converter output 242 to accommodate the requirements of the electromagnetic bearings.

Figure 3:
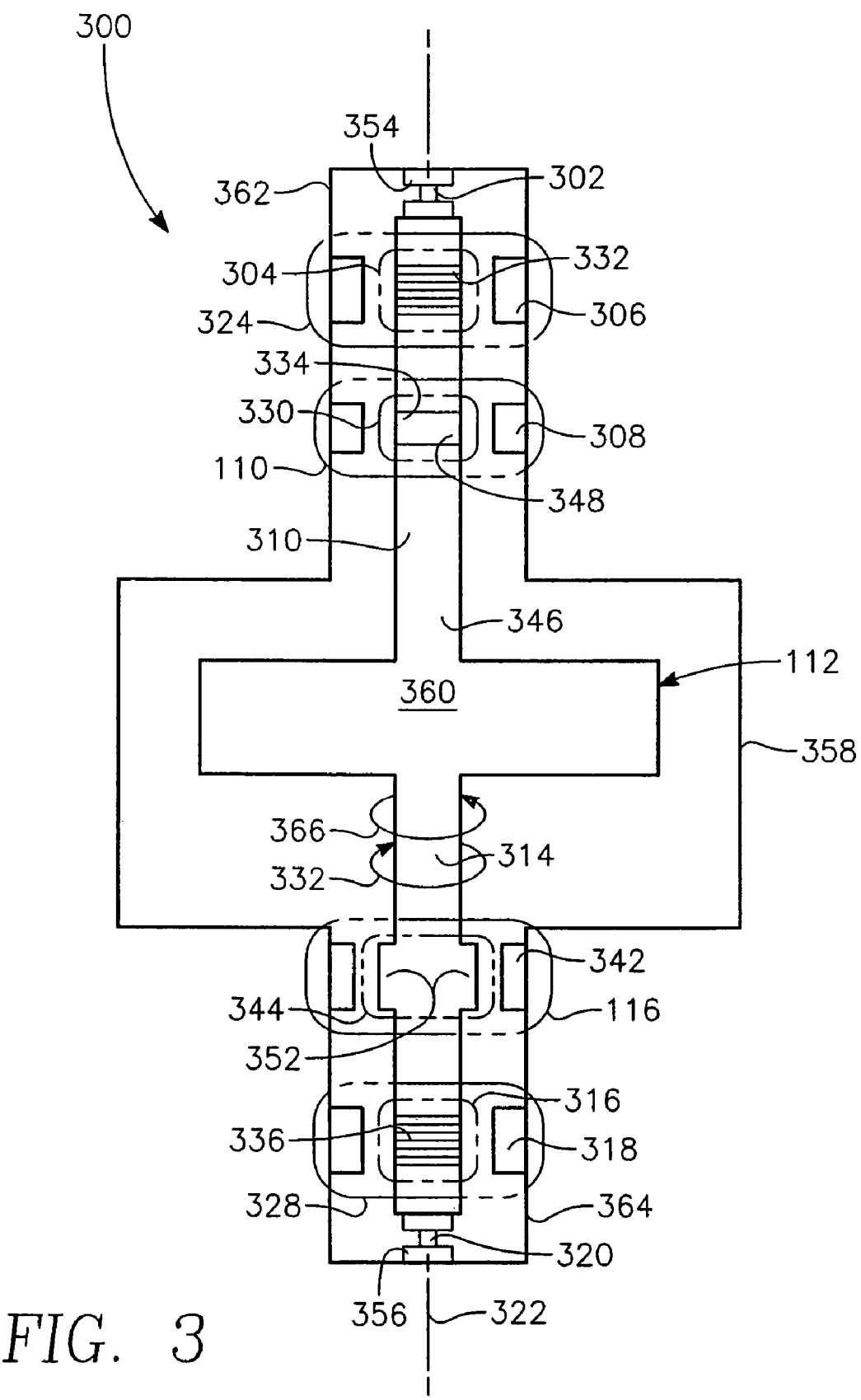
FIG. 3 is a diagram showing elements included in the flywheel module of the flywheel backup power supply system of FIG. 1.

FIG. 3 shows selected flywheel module elements 300. Rotating elements include the flywheel shaft 346 and the flywheel mass 112. Stationery elements include the flywheel housing 358, first and second electromagnets 306, 318, and first and second electric stators 308, 342. The flywheel 360 includes the flywheel mass 112 and the flywheel shaft 346. The flywheel shaft includes first and second sections 310, 314. The flywheel shaft shares a common axis of rotation 322 with and is attached to the flywheel mass.

The flywheel 360 has integrated features including antifriction bearings 354, 356 and electromagnetic bearings 324, 328, a backup AC generator 110, and a synchronous reluctance AC motor-generator 116. The sections that follow provide details relating to these features.

Antifriction bearings 354, 356 provide rotatable support to the flywheel 360 at low flywheel speeds. The flywheel utilizes first and second touchdown bearing shafts 302, 320 mated with respective first and second antifriction bearings 354, 356 for rotatable support. The antifriction bearings support both radial and thrust loads. The touchdown bearing shafts extend outwardly from respective opposing ends of the flywheel shaft and share a common axis of rotation 322 with the flywheel shaft 346. The first and second antifriction bearings 354, 356 are fixed to respective first and second flywheel housing parts 362, 364.

Electromagnetic bearing(s) 114 provide rotatable support to the flywheel 360 at higher flywheel speeds when the flywheel is no longer supported by the antifriction bearings 354, 356, but now relies on at least one electromagnetic bearing for support. Here, first and second electromagnetic bearings 324, 328 are shown. The first electromagnetic bearing 324 is proximate to the first shaft section 310 and includes an electromagnet 306 attached to the first flywheel housing part 362 and an adjacent ferromagnetic portion 304 that is integral with the flywheel shaft 346. The second electromagnetic bearing 328 is proximate to the second shaft section 314 and includes an electromagnet 318 attached to the second flywheel housing part 364 and an adjacent ferromagnetic portion 316 that is integral with the flywheel shaft 346.

Each of the ferromagnetic portions of the shaft 304, 316 includes a respective plurality of thin ferromagnetic laminates 332, 336 having electrical insulation interposed between adjacent laminates. These laminated ferromagnetic structures increase the effectiveness of the electromagnetic bearings by reducing eddy current losses. In particular, eddy currents induced in the ferromagnetic portions by the electromagnets result in $I^2 R$ heating losses. The thin ferromagnetic laminates reduce the magnetic flux in (results in smaller induced voltage) and the conductivity of (smaller conductive cross-section) each ferromagnetic laminate. The result is a reduction in eddy current losses by a factor of approximately $1/n^2$ where n is the number of lamella in a ferromagnetic portion.

The backup generator 110 is a variable speed permanent magnet AC machine. It includes a first electrical stator 308 adjacent to a flywheel shaft permanent magnet portion 330. The flywheel shaft permanent magnet portion is in the first flywheel shaft section 310 and includes a permanent magnet 348 integral with the flywheel shaft 346.

Since a permanent magnet generator is self-exciting, the backup generator generates electric power as long as the flywheel 360 is rotating even if no external source of electric power is available. The backup generator therefore provides electric power to the electromagnetic bearings 324, 328 when operation of the electromagnetic bearing(s) is desirable and when no other electric power source is available to operate the electromagnetic bearing(s). As a person of ordinary skill in the art will recognize, the power produced by the backup generator may be used to power electric loads internal or external to the flywheel system 100.

The motor-generator 116 is a variable speed synchronous reluctance (inductive) AC machine. It includes a second electrical stator 342 adjacent to a flywheel shaft reluctor portion 344. The reluctor portion is in the second flywheel shaft section 314 and includes a plurality of ferromagnetic reluctor poles 352 integral with the flywheel shaft 346.

While functioning as an electric motor, the motor-generator 116 transfers torque 332 to the flywheel shaft 346 increasing the rotational speed of the flywheel 360. While functioning as an electric generator, the motor-generator transfers torque from 366 the flywheel shaft reducing the rotational speed of the flywheel.

Since the motor-generator is not self-exciting, it produces electric power only when induced electric currents magnetize the rotating reluctor poles 352. An externally excited stator 342 that is magnetically coupled with the reluctor portion induces such currents. Therefore, the motor-generator 116 cannot generate electric power unless there is a source of electric power external to the motor-generator. The power electronics 104 may provide the excitation power; however, when the flywheel 360 speed falls below a minimum value, useful generation of electric power by the motor-generator ends.

Figure 4:
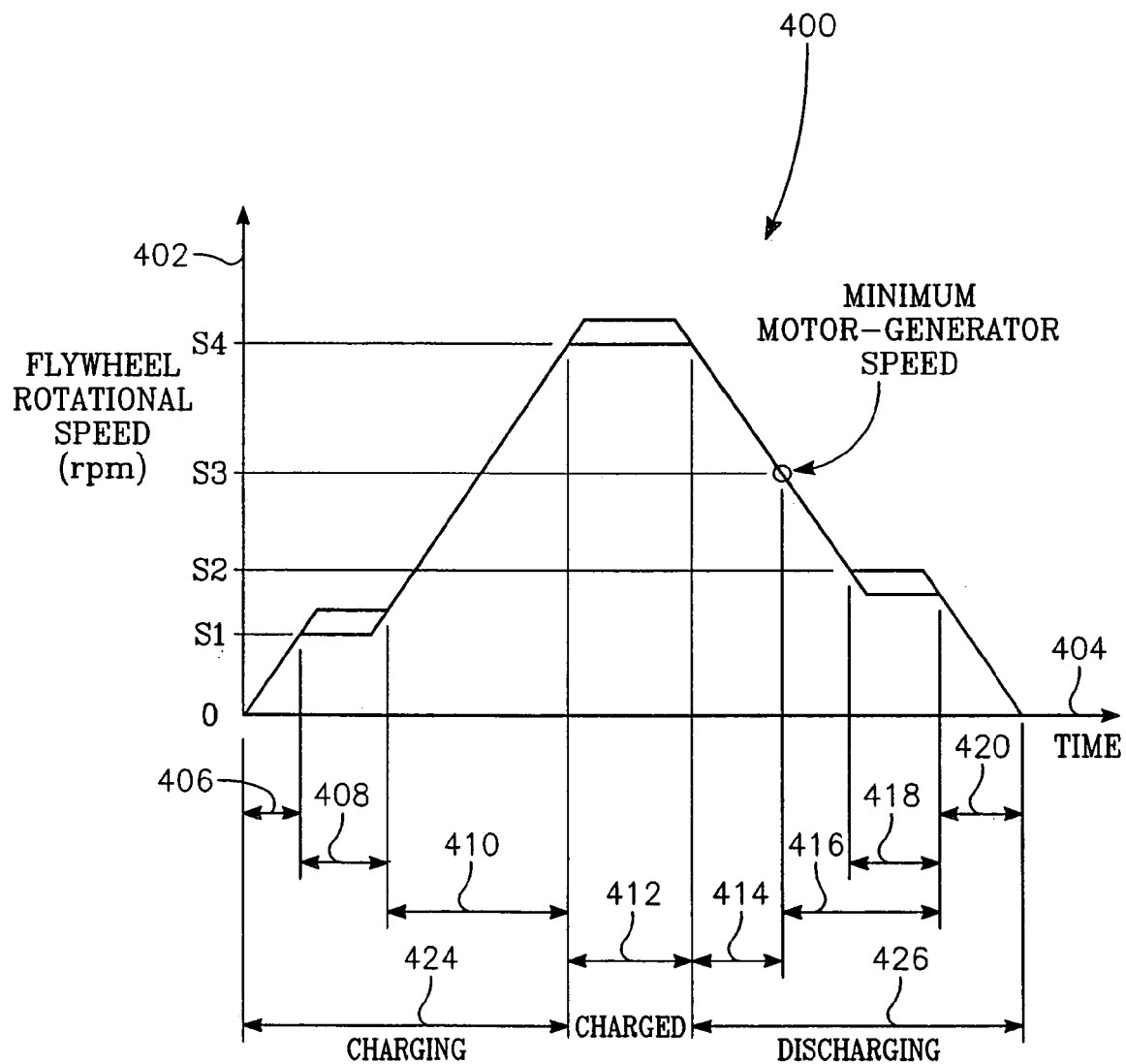
FIG. 4 is a diagram showing regimes included in the operation of the flywheel backup power supply system of FIG. 1.

FIG. 4 is a graph 400 that illustrates the charging, charged, and discharging cycle of the flywheel system 100. The vertical axis 402 represents rotational speed of the flywheel mass 112 in revolutions per minute (RPM). The horizontal axis 404 represents time.

Starting from a stand-still and during pre-liftoff 406, flywheel system charging begins when the motor-generator 116 functions as a motor, applying an accelerating torque 332 to the flywheel shaft 346 as electrical power is converted to mechanical motion. As the flywheel 360 speed increases, the electromagnetic bearing(s) 324, 328 operate during speed range S1 to substantially disengage the touchdown bearing shafts 302, 320 from the antifriction bearings 354, 356; this is termed "liftoff" 408.

During the post-liftoff period 410, the flywheel 360 is accelerated to the maximum speed range S4. Upon reaching speed range S4, the flywheel is fully charged 412. Prior to discharging, the motor-generator cycles on and off as required to maintain flywheel speed within speed range S4. This cycling is required to recover speed decay resulting from friction and other losses in the system.

While charging 424 and cyclically while charged 412, electrical power from the electrical network 106 is conducted in the direction of flow arrow 214 via external DC bus 108, the third converter 206, the internal DC bus 222, the second converter 204, and the third circuit 126 to the motor-generator 116. Electric power supplied to the internal DC bus by the electrical network also powers the electromagnetic bearing(s) 114 via second electrical circuit 124 as indicated by flow arrow 130.

The discharging period 426 begins when the motor-generator 116 functions as a generator, applying a retarding torque 366 to the flywheel shaft 346 and converting the energy of mechanical motion into electric power. During this process, the rotational speed of the flywheel 360 is reduced. As the speed decreases from speed range S4 to speed S3, the motor-generator generates electric power. Note that similar flywheel discharging occurs when the electrical network's external power source 232 is interrupted: In this case, the power flow to the electrical network 106 indicated by flow arrow 258 stops and the electrical network becomes dependent on the flywheel system for delivery of electric power via external DC bus 108 as indicated by flow arrow 136.

During the initial discharging period 414, electrical power from the motor-generator 116 is conducted in the direction of flow arrow 134 via the third circuit 126, the second converter 204, the internal DC bus 222, the third converter 206, and the external DC bus 108 to the electrical network 106 as indicated by flow arrow 136. Electrical power supplied to the internal DC bus by the motor-generator also powers the electromagnetic bearings 324, 328 via the second circuit 124 as indicated by flow arrow 130.

When the flywheel 360 reaches the minimum motor-generator speed S3, the synchronous reluctance (inductive) motor-generator 116 is no longer able to provide enough electric power to operate the electromagnetic bearing(s) 324, 328. During the subsequent backup power speed regime 416, the backup generator 110 provides sufficient electric power to operate the electromagnetic bearings. The backup generator also provides electric power for other electrical loads that may be necessary to the safe shut-down of the flywheel. As one who is skilled in the art will recognize, backup generator power is available via external DC tap 244 and internal DC tap 268 for powering critical loads whether they be internal or external to the flywheel system 100.

When touchdown 418 occurs in speed range S2, the electromagnetic bearing(s) are no longer needed and the antifriction bearing shafts 302, 320 are once again supported by respective antifriction bearings 354, 356.

During the backup power speed regime 416, electrical power from the backup generator 110 flows as indicated by flow arrow 208 via the first converter, the fifth circuit 224, the external DC bus 108, the third converter 206, the internal DC bus 222, and the sixth circuit 124 to the electromagnetic bearings 114 as indicated by the flow arrow 130. Here, the third converter is included in the power flow path to accommodate the backup generator's variable voltage output that rises and falls with the speed of the flywheel 360.

Post-touchdown 420 begins when the speed of the flywheel 360 falls below speed range S2. This regime is the final portion of the discharging process 426. If a source of external power is not available, the flywheel will come to rest.

While various embodiments of the present invention have been described above, it should be understood that they have been presented by way of example only, and not limitation. It will be understood by those skilled in the art that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of safely stopping a flywheel during a power outage comprising the steps of:
   providing a flywheel having a backup AC generator formed by an electrical stator adjacent to an integral permanent magnet portion of said flywheel;
   electrically connecting a unidirectional AC-to-DC electric power converter to said electrical stator; and,
   providing a DC bus for electrically interconnecting the DC output of said AC-to-DC electric power converter and electric loads critical to safe flywheel shutdown.

2. The method of claim 1 above wherein at least one electromagnetic bearing is a load critical to safe flywheel shutdown.

3. The method of claim 2 above wherein the electromagnetic bearing includes a fixed electromagnet adjacent to a ferromagnetic portion of a flywheel shaft said ferromagnetic portion formed from ferromagnetic laminates having electrical insulation interposed between them.

4. A method of safely stopping a flywheel during a power outage comprising the steps of:
   providing a flywheel having a backup AC generator formed by an electrical stator adjacent to an integral permanent magnet portion of said flywheel;
   electrically connecting a unidirectional AC-to-DC electric power converter to said electrical stator; and,
   providing a DC bus for directly electrically interconnecting the DC output of said AC-to-DC electric power converter and electric loads critical to safe flywheel shutdown.

5. A method of safely stopping a flywheel during a power outage comprising the steps of:
   providing a flywheel having a backup AC generator formed by an electrical stator adjacent to an integral permanent magnet portion of said flywheel;
   electrically connecting a unidirectional AC-to-DC electric power converter to the electrical stator;
   electrically interconnecting the AC-to-DC electric power converter and a flywheel electromagnetic bearing by way of a bidirectional DC-to-DC electric power converter; and,
   transferring electric power from the back-up AC generator to the electromagnetic bearing during an external power source outage.

6. The method of claim 5 including the step of transferring electric power from the back-up AC generator to an external electrical network via the AC-to-DC electric power converter during an external power source outage.

7. A method of safely stopping a flywheel during a power outage comprising the steps of:
   providing a rotatable assembly having a single axis of rotation and including
      a flywheel mass,
      a permanent magnet, and
      ferromagnetic laminates having electrical insulation interposed therebetween;
   providing a fixed assembly including
      an electrical stator adjacent to the permanent magnet,
      a fixed electromagnet adjacent to the ferromagnetic laminates, and
      a containment enveloping the rotating assembly, the first electrical stator and the fixed electromagnet;
   electrically interconnecting a unidirectional AC-to-DC electric power converter to said first electrical stator; and,
   transferring electric power from the AC-to-DC electric power converter to the electromagnet during an external power source outage.

8. The method of claim 7 including the step of electrically interconnecting the AC-to-DC electric power converter and the electromagnetic by way of a bidirectional DC-to-DC electric power converter.

9. The method of claim 8 including the step of transferring electric power from the AC-to-DC electric power converter to an external electrical network during an external power source outage.

10. A method of safely stopping a flywheel during a power outage comprising the steps of:
    providing a rotatable assembly having a single axis of rotation and including
       a flywheel mass,
       a reluctor,
       a permanent magnet, and
       ferromagnetic laminates having electrical insulation interposed therebetween;
    providing a fixed assembly including
       a first electrical stator adjacent to the reluctor,
       a second electrical stator adjacent to the permanent magnet,
       a fixed electromagnet adjacent to the ferromagnetic laminates, and
       a containment enveloping the rotating assembly, the first electrical stator, the second electrical stator and the fixed electromagnet;
    electrically interconnecting a unidirectional AC-to-DC electric power converter to said first electrical stator; and,
    transferring electric power from the second electrical stator to the fixed electromagnet by way of the AC-to-DC electric power converter.

11. The method of claim 10 including the step of transferring electric power from the second electrical stator to the electromagnet when electric power available from the first electrical stator is insufficient to supply the electrical load presented by the electromagnet.

* * * * *